(12) United States Patent
Breuer et al.

(10) Patent No.: US 11,216,871 B2
(45) Date of Patent: Jan. 4, 2022

(54) METHOD, APPARATUS AND SYSTEM FOR AUTOMATED FUNDING

(71) Applicant: Insperity Services, L.P., Kingwood, TX (US)

(72) Inventors: Mark Breuer, Kingwood, TX (US); Michelle Harold, Maysville, GA (US); John F. Tangredi, Santa Ana, CA (US)

(73) Assignee: INSPERITY SERVICES, L.P., Kingwood, TX (US)

( * ) Notice: Subject to any disclaimer, the term of this patent is extended or adjusted under 35 U.S.C. 154(b) by 1204 days.

(21) Appl. No.: 14/493,701

(22) Filed: Sep. 23, 2014

(65) Prior Publication Data

US 2015/0095075 A1   Apr. 2, 2015

Related U.S. Application Data

(60) Provisional application No. 61/883,939, filed on Sep. 27, 2013.

(51) Int. Cl.

| | | |
|---|---|---|
| *G06Q 40/02* | (2012.01) | |
| *G06Q 20/40* | (2012.01) | |
| *G06Q 10/06* | (2012.01) | |
| *G06Q 20/34* | (2012.01) | |
| *G06Q 10/10* | (2012.01) | |
| *G06Q 20/10* | (2012.01) | |

(52) U.S. Cl.
CPC ....... *G06Q 40/025* (2013.01); *G06Q 10/0631* (2013.01); *G06Q 10/10* (2013.01); *G06Q 20/10* (2013.01); *G06Q 20/34* (2013.01); *G06Q 20/354* (2013.01); *G06Q 20/40* (2013.01); *G06Q 20/409* (2013.01); *G06Q 20/4037* (2013.01)

(58) Field of Classification Search
None
See application file for complete search history.

(56) References Cited

U.S. PATENT DOCUMENTS

| | | |
|---|---|---|
| 5,265,008 A | 11/1993 | Benton et al. |
| 5,832,453 A | 11/1998 | O'Brien |
| 5,899,981 A | 5/1999 | Taylor et al. |
| 6,446,048 B1 | 9/2002 | Wells et al. |
| 6,578,015 B1 | 6/2003 | Haseltine et al. |
| 7,380,707 B1 | 6/2008 | Fredman |

(Continued)

OTHER PUBLICATIONS

"Real-time credit card fraud detection using computational intelligence", "School of Electrical and Electronic Engineering, Nanyang Technological University, Nanyang Avenue, Singapore 639798, Republic of Singapore", Expert Systems with Applications 35 (2008) 1721-1732, www.sciencedirect.com (Year: 2008).*

(Continued)

*Primary Examiner* — Christopher Bridges
*Assistant Examiner* — Tony P Kanaan
(74) *Attorney, Agent, or Firm* — Williams Morgan. P.C.

(57) ABSTRACT

Embodiments herein provide for performing an automated transaction. A request for funding is received. A request processing is performed in response to said request. The request processing comprises routing said request to a approval unit, determining by said approval unit that said funding is authorized, and determining that sufficient amount of funds are available for providing said funding. The funding is either approved or denied said funding based upon said request processing.

13 Claims, 9 Drawing Sheets

(56) References Cited

U.S. PATENT DOCUMENTS

| | | | |
|---|---|---|---|
| 8,190,517 B1 | 5/2012 | Baker et al. | |
| 8,600,871 B1 | 12/2013 | Tavares et al. | |
| 9,355,390 B2 | 5/2016 | Vasten et al. | |
| 9,779,384 B2 | 10/2017 | Fredericks et al. | |
| 9,785,945 B2* | 10/2017 | Groarke | G06Q 10/10 |
| 2002/0046058 A1 | 4/2002 | Brown | |
| 2002/0077978 A1 | 6/2002 | O'Leary et al. | |
| 2003/0078883 A1 | 4/2003 | Stewart | |
| 2003/0088487 A1 | 5/2003 | Cheng | |
| 2003/0233278 A1 | 12/2003 | Marshall | |
| 2004/0002876 A1 | 1/2004 | Sommers et al. | |
| 2004/0111370 A1 | 6/2004 | Saylors et al. | |
| 2004/0249745 A1 | 12/2004 | Baaren | |
| 2005/0010483 A1 | 1/2005 | Ling | |
| 2005/0015272 A1 | 1/2005 | Wind et al. | |
| 2005/0125317 A1 | 6/2005 | Winkelman, III et al. | |
| 2005/0222944 A1* | 10/2005 | Dodson, Jr. | G06Q 10/10 705/39 |
| 2006/0080126 A1 | 4/2006 | Greer et al. | |
| 2006/0206363 A1 | 9/2006 | Gove | |
| 2006/0206506 A1 | 9/2006 | Fitzpatrick | |
| 2006/0242154 A1 | 10/2006 | Rawat et al. | |
| 2006/0247993 A1 | 11/2006 | Scanlan et al. | |
| 2007/0083401 A1 | 4/2007 | Vogel et al. | |
| 2007/0083449 A1 | 4/2007 | Roberts | |
| 2007/0150411 A1 | 6/2007 | Addepalli et al. | |
| 2008/0015985 A1 | 1/2008 | Abhari et al. | |
| 2008/0215472 A1 | 9/2008 | Brown | |
| 2008/0288405 A1* | 11/2008 | John | G06Q 20/386 705/44 |
| 2008/0319808 A1 | 12/2008 | Wofford | |
| 2009/0047926 A1 | 2/2009 | Mastrantuono et al. | |
| 2009/0099965 A1* | 4/2009 | Grant, IV | G06Q 20/105 705/41 |
| 2009/0119190 A1 | 5/2009 | Realini | |
| 2009/0265232 A1 | 10/2009 | Gopalakrishnan et al. | |
| 2009/0287603 A1* | 11/2009 | Lamar, III | G06Q 20/102 705/40 |
| 2009/0287605 A1 | 11/2009 | Galit et al. | |
| 2010/0017316 A1* | 1/2010 | Joseph | G06Q 20/40 705/34 |
| 2010/0054088 A1 | 3/2010 | Edrington et al. | |
| 2010/0312700 A1* | 12/2010 | Coulter | G06Q 20/108 705/42 |
| 2011/0017973 A1 | 1/2011 | Hong et al. | |
| 2011/0137768 A1 | 6/2011 | Onishi et al. | |
| 2011/0166989 A1 | 7/2011 | Ross | |
| 2011/0184856 A1 | 7/2011 | Shakkarwar | |
| 2011/0231223 A1* | 9/2011 | Winters | G06Q 30/0201 705/7.29 |
| 2011/0258005 A1 | 10/2011 | Fredericks et al. | |
| 2011/0270748 A1 | 11/2011 | Graham, III et al. | |
| 2011/0295744 A1 | 12/2011 | Wisniewski et al. | |
| 2011/0295750 A1* | 12/2011 | Rammal | G06Q 20/325 705/44 |
| 2012/0030100 A1 | 2/2012 | Bulawa et al. | |
| 2012/0054088 A1 | 3/2012 | Edrington et al. | |
| 2012/0059745 A1 | 3/2012 | Fredericks et al. | |
| 2012/0130731 A1 | 5/2012 | Canetto | |
| 2012/0136921 A1 | 5/2012 | Samdadiya et al. | |
| 2012/0150605 A1 | 6/2012 | Isaacson et al. | |
| 2012/0185368 A1* | 7/2012 | Schloter | G06Q 40/12 705/30 |
| 2012/0209640 A1* | 8/2012 | Hamper | G06Q 40/12 705/5 |
| 2012/0290422 A1 | 11/2012 | Bhinder | |
| 2013/0041823 A1* | 2/2013 | Wagner | G06Q 20/32 705/44 |
| 2013/0080327 A1* | 3/2013 | Baldrick | G06Q 20/10 705/44 |
| 2013/0117183 A1 | 5/2013 | Bozeman | |
| 2013/0132275 A1* | 5/2013 | Enzaldo | G06Q 20/4016 705/44 |
| 2013/0198075 A1* | 8/2013 | Sakata | G06Q 20/382 705/44 |
| 2013/0226750 A1 | 8/2013 | Friedholm et al. | |
| 2013/0268333 A1* | 10/2013 | Ovick | G06Q 20/34 705/14.17 |
| 2013/0290178 A1 | 10/2013 | Massie | |
| 2014/0025959 A1 | 1/2014 | Dietrich | |
| 2014/0058855 A1* | 2/2014 | Hussein | G06Q 20/32 705/16 |
| 2014/0074709 A1* | 3/2014 | Green | G06Q 40/00 705/44 |
| 2014/0180849 A1 | 6/2014 | Kimberg et al. | |
| 2015/0120429 A1* | 4/2015 | Salmon | G06Q 20/387 705/14.33 |

OTHER PUBLICATIONS

PCT Application No. PCT/US2014/057908; International Search Report dated Mar. 4, 2015; 3 pgs.
PCT Application No. PCT/US2014/057908; Written Opinion of the International Search Authority; dated Mar. 4, 2015; 8 pgs.
PCT Application No. PCT/US2014/057910; International Search Report dated Feb. 6, 2015; 3 pgs.
PCT Application No. PCT/US2014/057910; Written Opinion of the International Search Authority; dated Feb. 6, 2015; 8 pgs.
PCT Application No. PCT/US2014/057914; International Search Report dated Feb. 4, 2015; 4 pgs.
PCT Application No. PCT/US2014/057914; Written Opinion of the International Search Authority; dated Feb. 4, 2015; 8 pgs.
PCT Application No. PCT/US2014/057915; International Search Report dated Jan. 26, 2015; 3 pgs.
PCT Application No. PCT/US2014/057915; Written Opinion of the International Search Authority; dated Jan. 26, 2015; 8 pgs.
PCT Application No. PCT/US2014/057916; International Search Report dated Feb. 2, 2015; 3 pgs.
PCT Application No. PCT/US2014/057916; Written Opinion of the International Search Authority; dated Feb. 2, 2015; 8 pgs.
Office Action dated Nov. 22, 2016 in co-U.S. Appl. No. 14/494,267, (now abandoned).
Office action dated Jan. 11, 2017 in co-pending U.S. Appl. No. 14/494,442, filed Sep. 23, 2014.
Final Office Action dated Jun. 22, 2017 in co-pending U.S. Appl. No. 14/494,442, filed Sep. 23, 2014.
Final Office Action dated Jun. 27, 2017 in co-pending U.S. Appl. No. 14/494,267, filed Sep. 23, 2014.
Office Action dated Dec. 5, 2017 in co-pending U.S. Appl. No. 14/494,442, filed Sep. 23, 2014.
Final Office Action dated Aug. 8, 2018 in co-pending U.S. Appl. No. 14/494,442, filed Sep. 23, 2014.
Office Action dated Apr. 18, 2019 in co-pending U.S. Appl. No. 14/494,442, filed Sep. 23, 2014.
Re-Issue final Office Action dated Jan. 22, 2020 in co-pending U.S. Appl. No. 14/494,442, filed Sep. 23, 2014.
Office Action dated Oct. 5, 2017 in co-pending U.S. Appl. No. 14/494,501, filed Sep. 23, 2014.
Final Office Action dated Apr. 9, 2018 in co-pending U.S. Appl. No. 14/494,501, filed Sep. 23, 2014.
Office Action dated Aug. 8, 2018 in co-pending U.S. Appl. No. 14/494,501, filed Sep. 23, 2014.
Final Office Action dated Mar. 4, 2019 in co-pending U.S. Appl. No. 14/494,501, filed Sep. 23, 2014.
Hua Chai, Honglei Zhang, Wenbing Zhao, P. Michael Melliar-Smith, and Louise E. Moser (Toward Trustworthy Coordination of Web Services Business Activities, IEEE Transactions on Services Computing, vol. 6, No. 2, Apr.-Jun. 2013). (Year 2013).
Final Office Action dated May 1, 2020 in co-pending U.S. Appl. No. 14/494,501, filed Sep. 23, 2014.
Final Office Action dated Feb. 4, 2021 in co-pending U.S. Appl. No. 14/494,501, filed Sep. 23, 2014.
Office Action dated Sep. 9, 2020 in co-pending U.S. Appl. No. 14/494,501, filed Sep. 23, 2014.

* cited by examiner

METHOD, APPARATUS AND SYSTEM FOR AUTOMATED FUNDING

The present application claims the benefit under 35 U.S.C. § 119(e) of prior-filed provisional application 61/883,939, filed Sep. 27, 2013, the disclosure of which is hereby incorporated by reference herein.

BACKGROUND OF THE INVENTION

1. Technical Field

Generally, the disclosed embodiments relate to automated funding, and, more particularly, automatically funding an expense payment infrastructure in response to a request.

2. Description of the Related Art

There have been many advancements in the area of financial transactions. Often, organizations such as corporations rely on employees or agents to act on their behalf performing various tasks in the interest of the organization. When performing these tasks, the employees or agents may incur expenses. In some cases, state of the art methods for providing funding for such expenses include having the employee or agent incur the cost themselves, and then reimbursing that amount to the employee or agent. Other state of the art methods include providing funding prior to the performance of a task or travel on behalf of the organization, and having an employee, or agent, utilize the provided funds for expenses. These methods can be inaccurate and cumbersome, reducing efficiency.

Some organizations have attempted to make the funding process more efficient. For example, some organizations attempt to increase efficiency by providing for receiving a request for funding and then having the request manually studied and approved, after which such requested funding is possibly granted. However, this process can be slow and cumbersome, and thus problems may result, e.g., the proper funding may not arrive in time. Generally, state of the art processes for funding lacks efficiency and accuracy. For example, it may be difficult to obtain proper funding without accurately knowing the amount of expenses that may be incurred. Further, there may be a delay in receiving approval for funding, which may further interfere in efficient execution of various tasks and/or travel performed by an employee or agent.

SUMMARY OF EMBODIMENTS

Generally, the present disclosure is directed to various methods, apparatus and system for performing an automated transaction. A request for funding is received. A request processing is performed in response to said request. The request processing comprises routing said request to a approval unit, determining by said approval unit that said funding is authorized, and determining that sufficient amount of funds are available for providing said funding. The funding is either approved or denied said funding based upon said request processing.

BRIEF DESCRIPTION OF THE FIGURES

The disclosed subject matter will hereafter be described with reference to the accompanying drawings, Wherein like reference numerals denote like elements, and.

Figure 1:
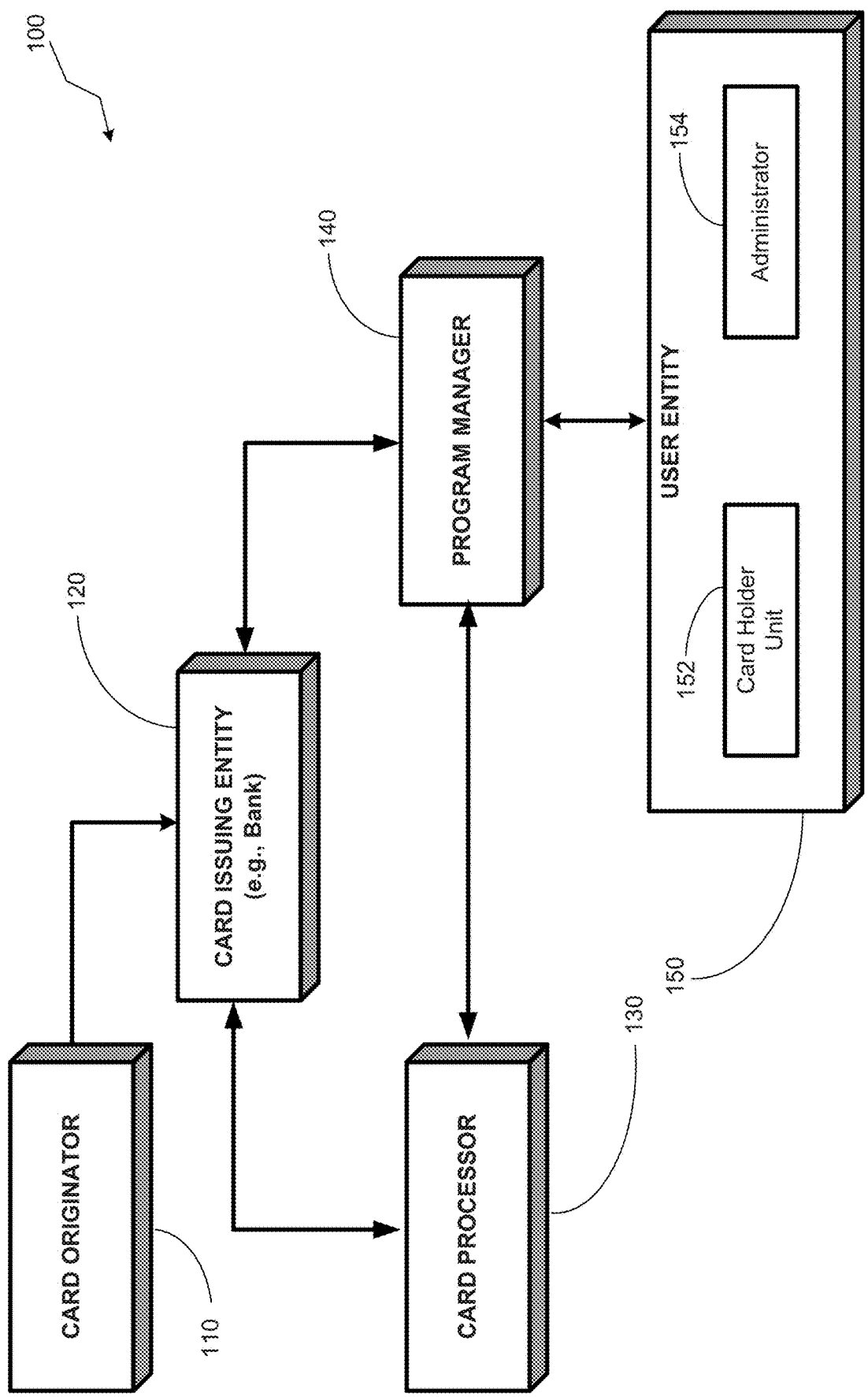
FIG. 1 provides a system for providing an automated funding process, in accordance with some embodiments of the present disclosure.

While the disclosed subject matter is susceptible to various modifications and alternative forms, specific embodiments thereof have been shown by way of example in the drawings and are herein described in detail. It should be understood, however, that the description herein of specific embodiments is not intended to limit the disclosed subject matter to the particular forms disclosed, but on the contrary, the intention is to cover all modifications, equivalents, and alternatives falling within the spirit and scope of the disclosed subject matter as defined by the appended claims.

DETAILED DESCRIPTION

Illustrative embodiments of the invention are described herein. In the interest of clarity, not all features of an actual implementation are described in this specification. In the development of any such actual embodiment, numerous implementation-specific decisions must be made to achieve the design-specific goats, which will vary from one implementation to another. It will be appreciated that such a development effort, while possibly complex and time-consuming, would nevertheless be a routine undertaking for persons of ordinary skill in the art having the benefit of this disclosure.

Embodiments herein provide for an automated request and approval of funds to an entity within an organization. For example, using a mobile device comprising a mobile application, automated management of approval or rejection of a request for funds may be performed. Further, using a mobile device comprising a mobile application, the distribution of funds within the work flow of an organization, such as a corporation, may be performed.

In some embodiments, a module, such as a mobile application, may interact with a module at a central location (e.g., a server) within an organization to control the approval or rejection of requested distribution of funds, for example, to be used by employees during travel on behalf of the organization. The automated management of funds provided by the embodiments herein may be allocated based on predetermined rules implemented by an organization, such as an end-user of a large funds transaction system, to perform automated expense management.

Embodiments herein provide for addressing the challenge of automating the process or controls necessary for an organization to distribute funds to employees in the field, while reducing the amount of paper forms and manual movement of the forms between resources. Embodiments herein may provide for performing a real time or near real time processing a funds request, wherein the processing may include at least one of distribution of the funds, denial of the funds, and/or a request to modify and resubmit the request. Embodiments provided herein provide for automatically monitoring and applying funds to a spendable account, such as a debit card, a credit card, and the like, based upon rules established by users of the automation process.

Embodiments herein provide for using remote devices (e.g., mobile phones such as smartphones, computers such as laptop computers, tablet computers, desktop computers, etc.), as well as modules (e.g., software modules, hardware modules, firmware modules, etc.) or applications (e.g., proprietary mobile application technology) to automatically and proactively manage the approval or rejection and distribution of funds within the workflow of an organization, such as a corporation. The workflow may refer to methods associated with allocating funds for use by employees for spending required for the business. This automatic management of funds allocation based on pre-established rules set by the end users may be part of the broader communication functionality of the end to end expense management and reporting process automated by the integrated solution.

The solutions provided by embodiments herein may solve the challenge of automating the process of controls necessary for organizations to distribute funds to employees in the field without having to generate paper forms and manually move the forms between resources. The solutions provided by embodiments herein may also use automation to automatically monitor and apply funds to payment mechanisms (e.g., debit cards, pre-paid cards, credit cards, wireless payment devices, mobile phone payment modules or applications, etc.) based on predetermined rules.

The functionality of embodiments herein provide for organizations (e.g., corporations) to quickly and easily transfer company funds to and from employees in a real time or a near real time basis using a linked system of pre-paid debit cards or other payment mechanisms, such as credit cards, wireless payment devices, mobile phone payment modules or applications, etc. The functionality of automatic request and approval may be managed through a proprietary module, which may be standalone, intranet, Internet, and/or mobile application based. The module may be a software module, a hardware module, a firmware module, or a combination thereof. Operation of the system may be facilitated by a graphical user interface (GUI) that may provide interaction between the system and a user or a program manager via various avenues, such as a remote computer (e.g., a laptop) or a mobile device, such as a cellular phone.

In some embodiments, the disclosure provides remote devices (e.g., mobile phones such as smartphones, computers such as laptop computers tablet computers, desktop computers, etc.), as well as modules (e.g., software modules, hardware modules, firmware modules, etc.) or applications (e.g., proprietary mobile application technology) to automatically and proactively send communications (e.g., notifications) regarding the need for, approval or rejection and distribution of funds within a workflow of an organization, such as a corporation. The notifications may be made via a variety of media, such as text messaging, email messages, social network venues, chat applications, paging applications, and/or the like.

Turning now to FIG. 1, a block diagram depiction of a funds management system for providing or automating request and approval of funding, in accordance with some embodiments, is illustrated. The system 100 may comprise a card originator 110, which provides a financial transaction mechanism for performing financial transactions. The card originator 110 may provide a transaction mechanism that is a spendable transaction card, such as a debit card or a credit card issued by an entity such as Visa, Master Card, American Express, Discover Card, etc. The card originator 110 may provide other transaction mechanisms for facilitating transactions, e.g., wireless transfer of fluids from an electronic device, such as a stand-alone transaction electronic device, an application on a remote portable computer, or a mobile device, such as a cell phone. The card originator 110 may be in communication with a card issuing entity 120, such as a bank. The card issuing entity 120 may be a principal member of the card originator 110. For example, the card issuing entity 120 may enter into an agreement with the card originator 110 to provide funding for the transaction mechanism provided by the card originator 110.

The system 100 may also comprise a program manager 140, which may be an entity that is capable of managing manual and automated financial transactions between a user entity 150 and a card processor 130. The card processor 130 may be capable of processing a financial transaction initiated by a user utilizing a transaction mechanism provided by the card originator 110.

The user entity 150 may be an organization, such as a corporation, that utilizes the automated transaction request and approval provided by the system 100. For example, the user entity 150 may be a corporation that signs on with the program manager 140 to manage the automated request and transaction provided by the system 100. The program manager 140 may provide an infrastructure for members of the user entity 150 to request funding for an expense and receive automated approval, in some embodiments, in real time or near real time. In some embodiments, the approval may be provided manually and in other embodiments, the approval may be provided automatically. The approval may be provided automatically based upon rules-based, threshold-based, and/or event-based scenarios.

The program manager 140 may be an entity that provides management services that facilitates automated request and approval of funding. One example of a program manager 140 is Insperity, Inc. The card issuing entity 120 may be a member of the card originator 110. The card originator 110 and the card issuing entity 120 may enter into an agreement with the program manager 140 for providing a business model to market and distribute various transaction mechanisms, such as the debit cards and credit cards. The program manager 140 may enter into an agreement with the card processor 130, wherein the agreement may be approved by the card issuing entity 120. This agreement may comprise provisions for interfacing with payment networks described herein for accounting of transactions performed using transaction mechanisms, authorization and settlement of accounts, etc.

The program manager 140 supports automatic request and approval of funding within the user entity 150. The user entity 150 may comprise a card holder unit 152 and an administrator 154. The card holder unit 152 may be a user of the financial transaction mechanism. The administrator 154 may be an entity that is capable of approving (a) request(s) for funds. The administrator 154 may prompt funding of transaction mechanism, e.g., the card, in response to the approval of a request for funding.

The administrator 154 may exercise various controls over the operation of the card program, which includes evaluating a funding request, providing approvals for the requests, prompting modification of the requests, providing funding responsive to the requests, scheduling a transfer of funds, managing expense cards, managing groups that may use one or more expense cards, withdrawing or pulling back funds from previously allowed expense funding, etc. The administrator 154 may perform the function of various administrative tasks over an individual user or a group of users. In alternative embodiments, a separate group administrator may provide for performing various administration functions for controlling the group expense activities.

In some embodiments, the user entity 150 may also comprise a group manager. The group manager may be part of the administrator 154, or in alternative embodiments may be a separate entity. In some embodiments, the group manager may be limited to the tasks of managing cards, approval or denial of expense requests, status views, report generation, etc. In some embodiments, the group manager may be restricted to controlling the operation of approvals, etc. within one or more groups that is managed by the group manager. Alternatively, the functions of the group manager may be encompassed by the administrator 154. The duties of the administrator 154 may be performed manually and/or automatically using software, hardware, and/or firmware modules that may be programmed to implement rules-based, threshold-based, and/or event-based protocols.

The term "card" as used herein, may include various financial transaction mechanisms, such as credit cards, debit cards, auto payment, electronic devices, and transaction applications (apps) residing on an electronic device, such as a mobile device, or portable computer, a tablet computer, etc. some embodiments, the term "expense card" may be utilized to signify the card described above.

In order to deploy the system described in FIG. 1, a set-up and configuration process may be performed. For example, the configuration and set-up process may include confirming and/or creating a payment method for one or more expense cards. In some embodiments, a group may be created, wherein a plurality of expense cards may be funded from a single account or a group of accounts that are controlled by a single entity, e.g., a group administrator. Further, the payment method may be associated with a financial institution such as the card issuing entity 120. An expense card management role may be assigned to an expense card administrator, such as the administrator 154. Further, an expense card group manager role may be assigned to managers of the user entity 150. The group manager may be able to approve and manage the expense card groups. The expense card groups may include one or more card holder units 152. The expense card group manager may be an automated entity and may be comprised of software or hardware module that is capable of receiving requests, demanding modifications to the requests, providing approval of funds requests, and/or prompting funding of an expense card upon approval of a funding request.

In an alternative embodiment, once expense card groups are created, a card holder role may e assigned to a card holder unit 152, e.g., an employee of a corporation. The employee may be issued an expense card and further, the employee may be assigned to a particular expense card group. Funds may then be transferred to the expense cards in the group and an automated request and approval process may be facilitated by the program manager 140 and the user entity 150. The administrator 154 may provide for a graphical user interface (GUI) for performing the set up described above.

Figure 2:
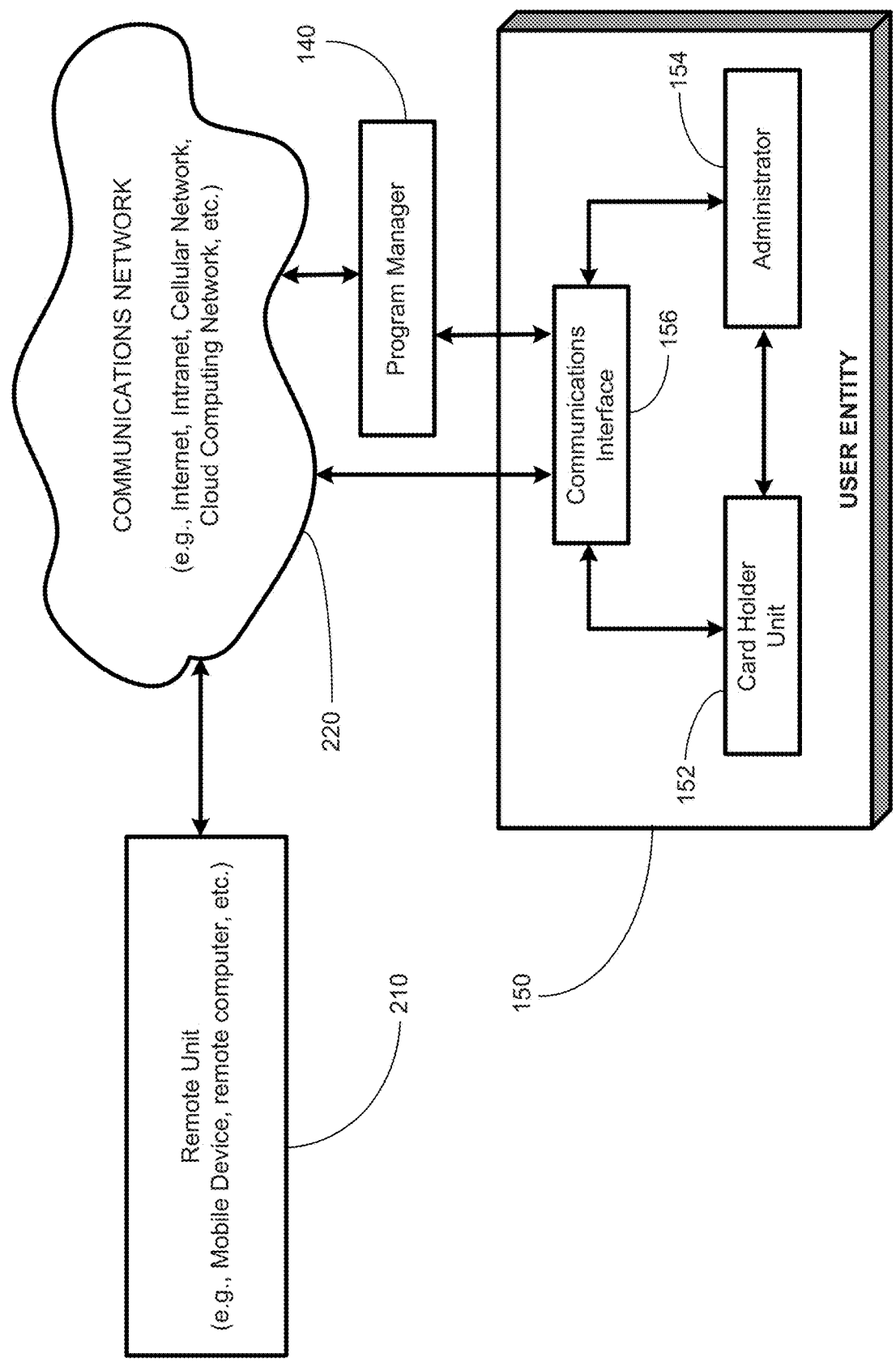
FIG. 2 illustrates a stylized depiction of a remote unit in communications with a user entity of the system of FIG. 1, and the program manager of FIG. 1, in accordance with some embodiments of the present disclosure.

Turning now to FIG. 2, a stylized, blocked diagram depiction of a remote unit in communication with the user entity of FIG. 1, in accordance with some embodiments, is illustrated. A remote unit 210 may be one of several types of communications and/or computing devices that may interface with the user entity 150. For example, the remote unit 210 may be a mobile device, a remote computer, a tablet computer, a smart watch device, a wearable computing device, a desktop computer, or any other device that has communications and/or computing capabilities. The term "communications" may include audio communications, radio communications, electronic communications, data communication, and/or analog communications.

The remote unit 210 may communicate with the user entity 150 via a communications network 220. The communications network 220 may comprise the Internet, an intranet, a cloud computing network, a peer-to-peer network, a closed communication network system, and/or the like. The communication network 220 provides for communications links between the remote unit 210 and the program manager 140 and the user entity 150.

In order to facilitate communications with the user entity 150, the user entity 150 may comprise a communications interface 156. The communications interface 156 is capable of providing a communications link between the remote unit 210 and the user entity 150. The communications interface may comprise various hardware, firmware and/or software modules that provide for digital and/or analog communications between the remote unit 210 and the user entity 150. In this manner, the remote unit 210 may be able to perform various functions involving the cardholder unit 152 and the administrator 154, such as requesting or providing approvals for expenses, funding an expense card associated with a card holder, and/or various activities concerning the administrator 154. Therefore, a user utilizing the remote unit 210 may be able to achieve real time or near real time approval of an expense and/or funding of an expense card via the communications network 220. Therefore, a manager in charge of approving transactions or funding may in real time, provide such funding and approvals. Similarly, an automated approval may also be provided based upon a request received via the communications network 220. In alternative embodiments, the remote unit 210 may be a computer system, which may be comprise a software, hardware and/or firmware module that is configured to provide for automated approvals, funding based upon a funding request, and/or seek approvals or funding.

Figure 3:
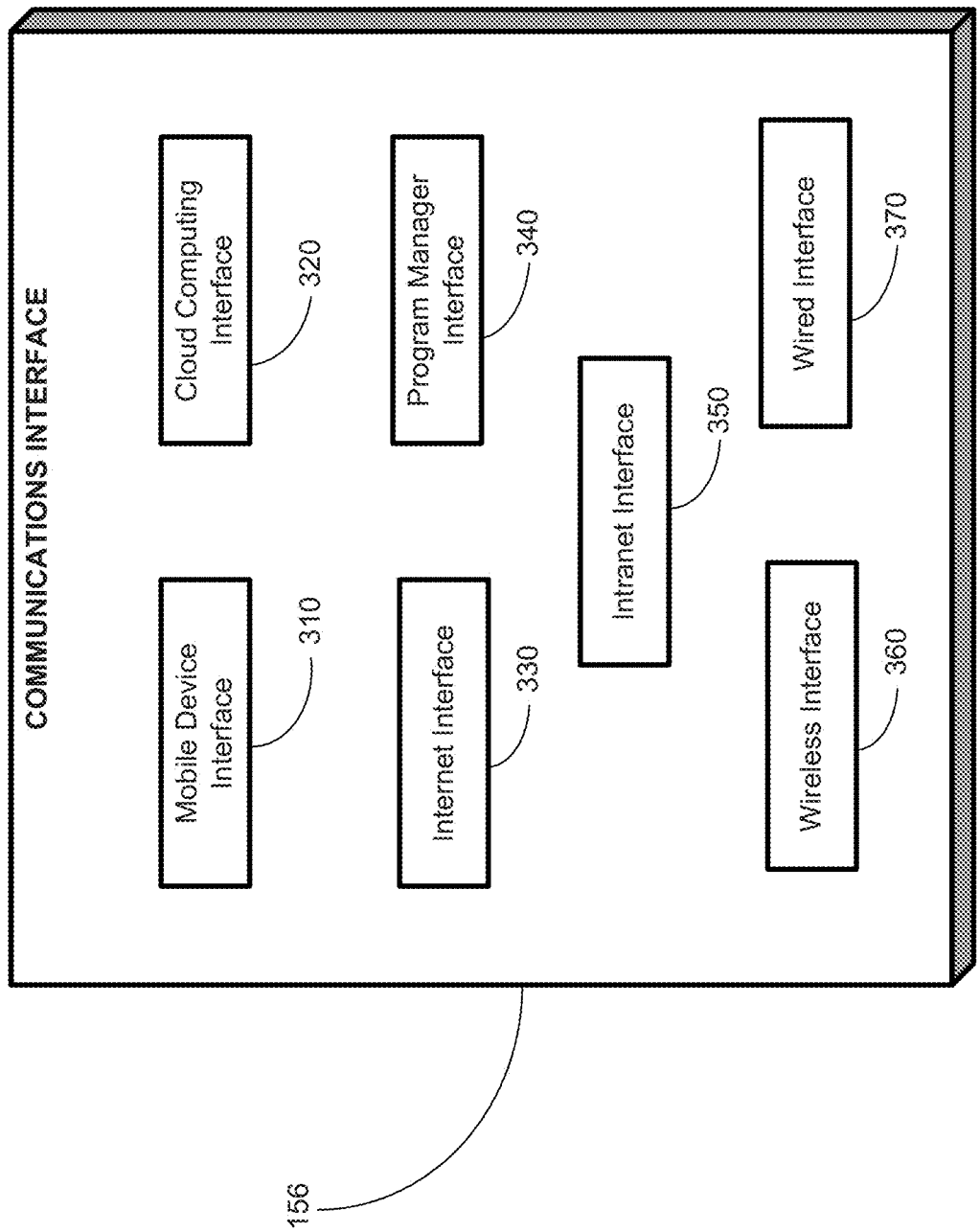
FIG. 3 illustrates a stylized block diagram depiction of a communications interface of the user entity of FIG. 2, in accordance with some embodiments of the present disclosure.

Turning now to FIG. 3, a stylized block diagram depiction of the communications interface 156 of FIG. 2, in accordance with some embodiments, is illustrated. The communications interface 156 provides for communications between the user entity 150 and the program manager 140 and/or the communications network 220. Through the communications network 220 (FIG. 2), the user entity 150 is capable of communicating with a remote device 210 (e.g., a mobile device). The communications interface 156 may comprise various interfaces that are capable of communicating with electronic devices using various types of communications methods. The communications interface 156 may comprise a mobile device interface 310 that will allow cellular network communications between the user entity 150 and a mobile device. The communications interface 156 may also comprise a cloud computing interface 320 that is capable of facilitating communications between the user entity 150 and any device via a cloud network. The communications interface 156 may also comprise an Internet interface 330 that provides for communications between the user entity 150 and any device via the Internet.

A program manager interface 340 in the communications interface 156 may provide for direct communications between the user entity 150 and the program manager 140. In some embodiments, a private communications network may be set up between the program manager 140 and the user entity 150. An intranet interface 350 in the communications interface 156 provides for communications between the user entity 150 and an intranet network, such as a private network.

The communications interface 156 may also comprise a wireless interface 360 and a wired interface 370. The wireless interface 360 provides for communications between the user entity 150 and any device via a wireless communications network, such as a wireless router attached to a device, e.g., 802.11xx communications, Bluetooth communications, etc. The wired interface 370 may provide for wired communications between the user interface 150 and an electronic device. Wired communications may include an Ethernet wired communications link, a USB communications link, etc. Those skilled in the art, having benefit of the present disclosure would appreciate that the communications interface 156 may comprise other types of communications interfaces that provide for communications between the user entity 150 and other devices.

Figure 4:
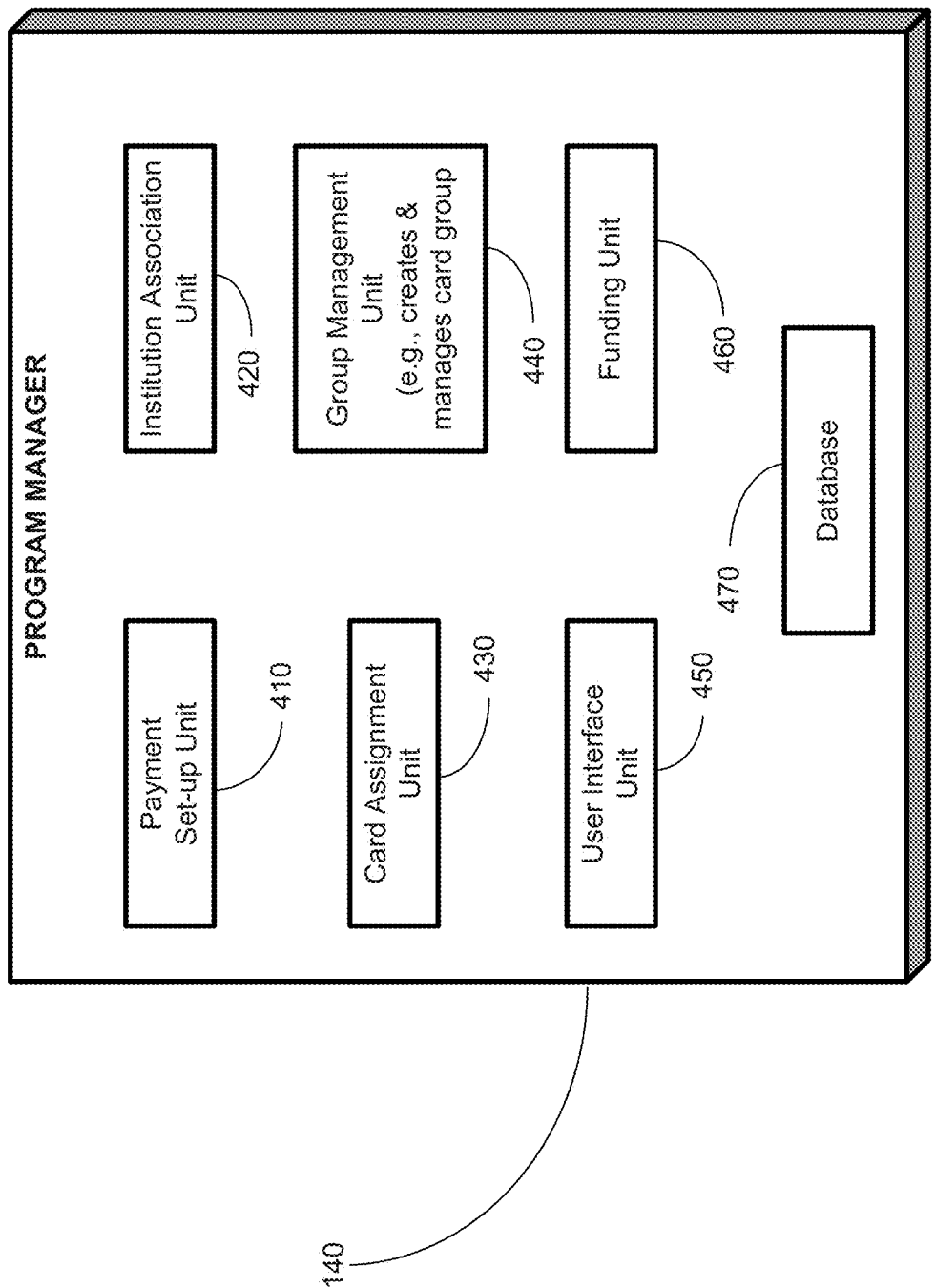
FIG. 4 illustrates a stylized depiction of a program manager of FIG. 1, in accordance with some embodiments of the present disclosure.

Turning now to FIG. 4, a block diagram depiction of the program manager 140 of the system 100 (FIG. 1), in accordance with embodiments herein is presented. The program manager 140 may be an entity that interfaces with the card issuing entity 120, the card processing unit 130 and the user entity 150 (FIG. 1) in order to facilitate transaction approval and automated funding of an expense card. In one embodiment, the program manager 140 provides for controlling financial transactions and/or approvals of financial transactions between a user entity 150 and a card processor 130. In one embodiment, the program manager 140 may interface with the administrator 154 of the user entity 150 for providing control over a card program that provides for automated approval and funding of expense cards.

The program manager 140 may comprise a payment set-up unit 410, an institution association unit 420, a card assignment unit 430, a group management unit 440, a user interface unit 450, a funding unit 460, a database unit 470, and a program manager interface 480. The units 410-480 of the program manager 140 may be comprised of hardware modules, software modules, and/or firmware modules.

The user interface unit 450 may provide for communications between the program manager 140 and the user entity 150, and more specifically, the administrator 154 and a user of an expense card. The payment set-up unit 410 may be configured to setup an infrastructure for funding an expense card. The method of payment, for example, may be set-up by the payment set-up unit 410. The payment set-up unit 410 is capable of receiving predetermined rules from the card processor 130, the card issuing unit entity 120, and/or the user entity 150. These rules may be dynamically modified. The payment method may include mechanisms for electronically transferring funds from a predetermined account to an expense card, and/or to a group account, which in turn may provide funding to expense cards associated with the group. In some embodiments, a graphical user interface (GUI) may be set up to allow for an administrator to log in and set-up a payment system. One example of GUI for setting up a payment method is exemplified in Appendix A. The exemplary GUI illustrated in Appendix A is provided for exemplary purposes, and those skilled in the art having benefit of the present disclosure may implement various other interfaces and remain within the spirit and scope of the present invention.

The institution association unit 420 of the program manager 140 may provide for associating an expense card payment method to a particular financial institution, such as the card issuing entity 120 (FIG. 1). A particular expense card may be classified as a particular type of card, such as a corporate expense card for example, and may be associated with a particular financial entity, such as the card issuing entity 120. The institution association unit 420 may be associated with one or more graphical user interface screen that may allow for an administrator to set-up an association for a particular expense card with a particular financial institution. One example of a GUI that may be used by the institution association unit 420 is provided in Appendix B.

The card assignment unit 430, along with the program manager 140 is capable of providing for assigning an expense card to a card user. A particular user may be assigned an expense card wherein various limitations and rules may be set-up for usage of the expense card. An Administrator may set-up the assignment of an expense card to a particular user. The card assignment unit 430 is capable of providing information regarding the card user to the administrator or a card group, and is capable of correlating an expense card to the user-profile of the user. One example of a GUI utilized for assigning an expense card to a user is exemplified in Appendix C.

The group management unit 440 provides for creating and managing an expense card group. An expense card group may be used to combine various card holders into a predetermined group; wherein rules may be set-up to control the operation of automated expense approvals for the group. For example, one division of a corporation may be selected for using expense cards. A subset of employees of that division may be assigned individual expense cards, wherein a set of rules may be used to provide guidance for usage of the expense cards. These rules may include limitations regarding maximum expenses, prior approvals being required for expenses, and/or automated approvals of expenses, among other rules. For example, particular rules may be set-up for providing a maximum amount that may be transferred to a particular card holder's expense account. The maximum amount be a function of a limit on allowable expenses by a user per unit of time (e.g., per day) and/or a function of the maximum amount of funding that is available to that particular group. The group management unit may utilize a GUI for allowing an administrator to set-up groups, and/or set up a group manager for controlling expense accounting of the group. Appendix D illustrates an exemplary GUI that may be utilized for creating and/or managing a card group. The group management unit 440 may also allow for adding or deleting individuals from a particular expense group.

The funding unit 460 of the program manager 140 may provide for funding of the expense cards. The funding may be based upon pre-determined rules that may apply uniquely for different card holders or for different groups. Once an expense card has been authorized for funding, the funding unit 460 may prompt movement of funds from a master account to an expense card. In another embodiment, once an expense card has been authorized for funding, the funding unit 460 may prompt movement of funds from a master account to a group account, wherein another entity such as the group manager, may prompt the funding unit 460 to move funds from the group account to the individual expense card. Alternatively, once a certain amount of funds are provided to the group account, all members of the group may use individual expense cards so long as individual limits associated with each expense card are not exceeded, and the total expenses of the group do not exceed the amount available in group account.

The database 470 may comprise one or more sub-databases of data portions that may store various rules and card holder data, as well as financial institution data and card issuance data. The database 470 may hold information with regard to the user entity 150, the administrator 154, the card holder 152, etc. The database 470 may also store funding data, account data, transaction history data, and/or information with regard to individual cardholder users. The database may store data for, and/or provide data to, various portions of the program manager 140, the user entity 150, the card processor 130, the card issuing entity 120, and/or the card originator 110. The database 470 may store information utilized by the various units 410-460 of the program manager 140. In some embodiments, database 470 may be a standard database accessible by normal addressing. In other embodiments, the database may be a relational database and/or a hierarchical database.

Figure 5:
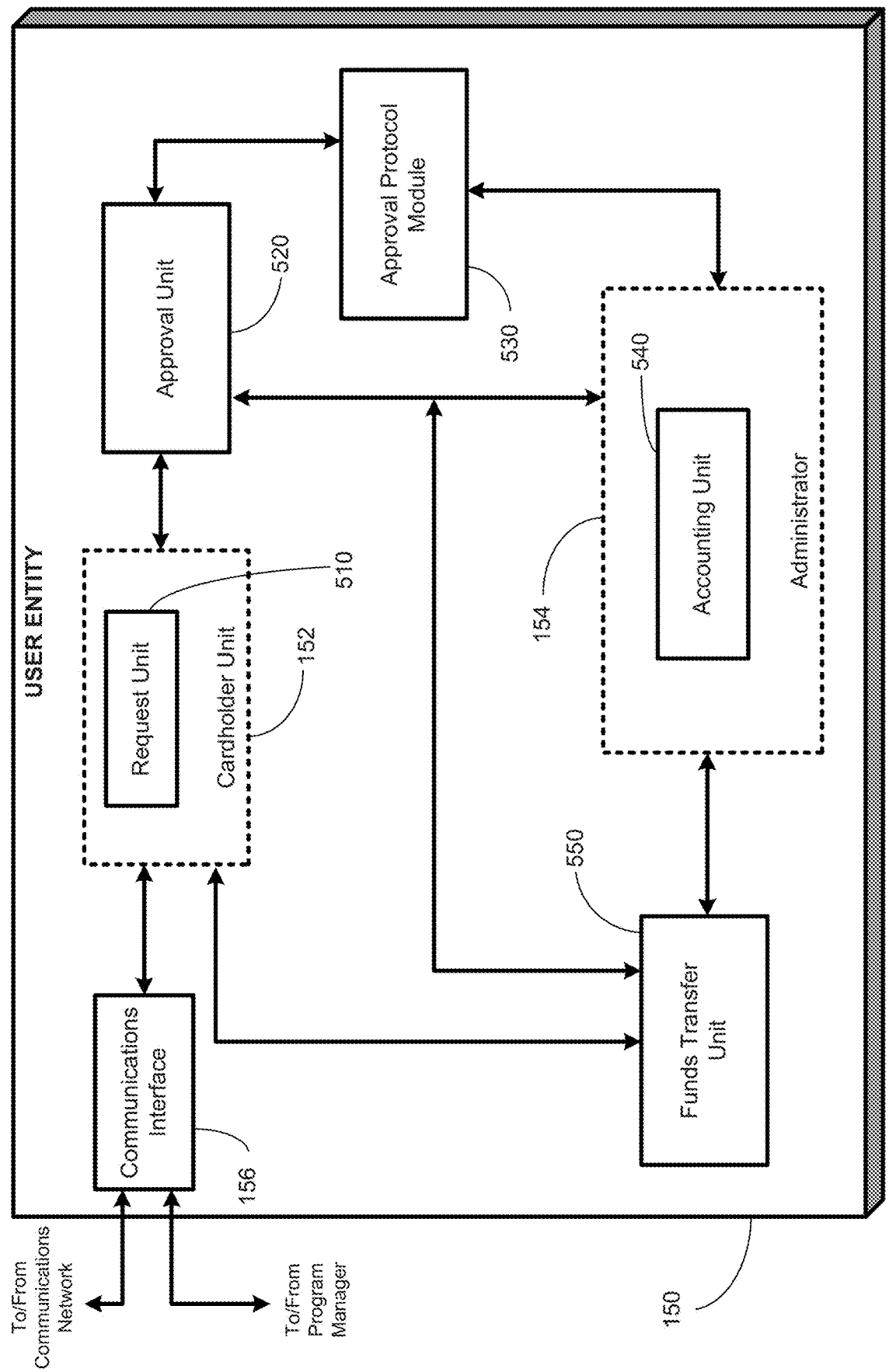
FIG. 5 illustrates a stylized block diagram depiction of the user entity of FIG. 2, in accordance with some embodiments of the present disclosure.

Turning now to FIG. 5, a more detailed stylized block diagram depiction of the user entity 150, in accordance with some embodiments, is presented. As illustrated in FIG. 5, the communication interface 156 may communicate with the communication fretwork 220 as well as with the program manager 140. The card holder unit 152 described above may comprise a request unit 510. The request unit 510 may be capable of processing a request received from a user via the communications network 220 and/or the program manager 140. The request unit 510 is capable of providing feedback based on a request for funding. The request unit 510 may process a funding request for further approval, process an inquiry regarding additional information, provide a message to modify the request, and/or deny the request.

Information from the request unit 510 and other data from the card holder unit 152 may be provided to the approval unit 520. The approval unit 520 may be capable of making a determination whether to approve a request for funds. The approval unit 520 may be configured to perform various checks (rules test, threshold test, event test, etc.) prior to approving a request for funds. The approval unit 520 may comprise one or more rules that may be checked when determining whether to provide an approval or rejection of the request. In alternative embodiments, a separate module may be used to stores rules, thresholds, and/or event tests, and may be configured to receive further programming. For example, the user entity 150 may comprise an approval protocol module 530 that is capable of providing indications to the approval unit 520 for determining whether to approve or deny a request for funding. The approval protocol module 530 may be configured with one or more rules, thresholds, event checking functions, etc., in order to determine whether approval should be provided.

In addition to checking for rule based, event based or threshold based tests, the approval unit 520 may also interface with the administrator 154 in order to determine whether a request should be approved or denied. For example, the administrator 154 may comprise an accounting unit 540. The accounting unit 540 may comprise information relating to the account that may be used to provide the funding, the amount of funds available, and the amount of funds allowable for a particular user, etc. Therefore, in addition to rules protocol or threshold or event protocol, the approval unit 520 may also check accounting parameters in order to determine whether to provide an approval for a funding request. For example, if the rules, events or threshold protocols indicate that an approval can be made, but the accounting unit 540 provides information indicating there is a lack of funds in the master account, the approval unit 520 may reject the request. Further, the approval unit 520 may provide a reason for the rejection and an invitation to either modify the request or attempt the request at a later time.

The user entity 150 may also comprise a funds transfer unit 550. The funds transfer unit 550 may be in communication with the administrator 154 as well as the approval unit 520. Based upon an approval provided for funding, the fund transfer unit 550 may perform a fund transfer process in order to transfer funds to the card holder unit 152. The funds transfer unit 550 may receive instructions from the administrator 154 to perform a fund transfer transaction. The fund transfer unit 550 may also provide information to the approval unit 520 that a fund transfer cannot be made for one or more reasons, e.g., lack of funds, delay in replenishing funds into the master account, etc. Upon receiving such information, the approval unit 520 may reject a request, withdraw a prior approval of the request, or provide instructions to modify or resubmit the request at a later time. The various portions of the user entity 150 may be automated using one or more computing devices comprising hardware, software, and/or firmware modules. Further, the various portions of the user entity 150 illustrated in FIG. 5, may be comprised of hardware, firmware, and/or software modules.

Figure 6:
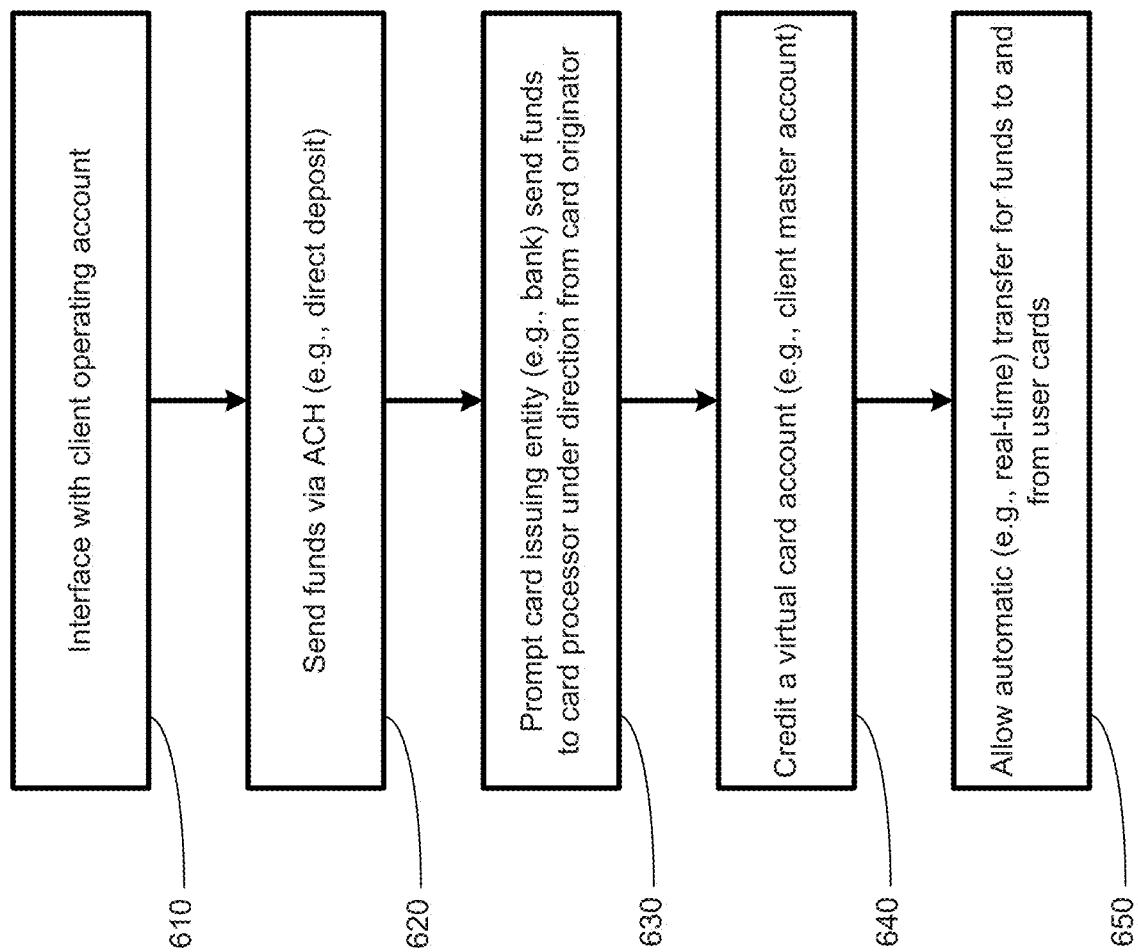
FIG. 6 illustrates a flowchart depiction of a process of performing a funds flow process, in accordance with some embodiments of the present disclosure.

Turning now to FIG. 6, a flowchart depiction of a funds flow process, in accordance with embodiments herein, is illustrated. In one embodiment, the program manager 140 may interface with a client operating account to the user entity 150 (block 610). In one embodiment, this interaction may be prompted by the user entity 150 in response to an expense funding request. In another embodiment, this interaction may be prompted by an indication to automatically replenish an expense account. The automatic replenishment may be responsive to the detection of an event (e.g., the end of a business trip), or passing of a predetermined time window (e.g., replenishment at the end of every month).

In some embodiments, the card issuing entity 120, such as a bank, may interact with the user entity 150 via a program manager 140. The interfacing of the program manager 140 with the client operating account may include establishing a communications protocol with the client operating account. Upon establishing a communications protocol with the client operating account, one or more transactions may be made, e.g., providing funding to the account or extracting funds from the account.

Upon interfacing with the client operating account, funds may be provided to the account (block 620). In some embodiments, the funds may be transferred electronically, e.g., an automated clearing house (ACH) electronic network may provide a direct deposit to the client operating account. Upon providing the funds, a prompt may be made to the card issuing entity 120 (e.g., a bank) to send funds to the card processor (block 630). The prompting of the card issuing entity 120 may be performed by the program manager 140. The transfer of the funds to the card processor 130 may be performed under the direction of the card originator via the program manager 130.

A virtual card account, e.g., a client master account, may be credited upon funding (block 640). The client master account may be part of the card holder unit 152 of the user entity 150. Once a virtual card account is funded, automated transfer of funds to and from user cards may be allowed (block 650). The automated transfer of funds to and from the user cards may be performed in a real-time or a near real-time manner. Exemplary embodiments of performing the automated real-time transfer and approval are described below. The automated transfer of funds may be made to user cards of employees, for example, for funding various activities, (e.g., travel, other expenditures) performed by the employee on behalf of the user entity 150. Those skilled in the art, having benefit of the present disclosure would appreciate that other methods of providing funds to a virtual card account, such as a client master account, may be performed while remaining within the spirit and scope of the embodiments disclosed herein.

Figure 7:
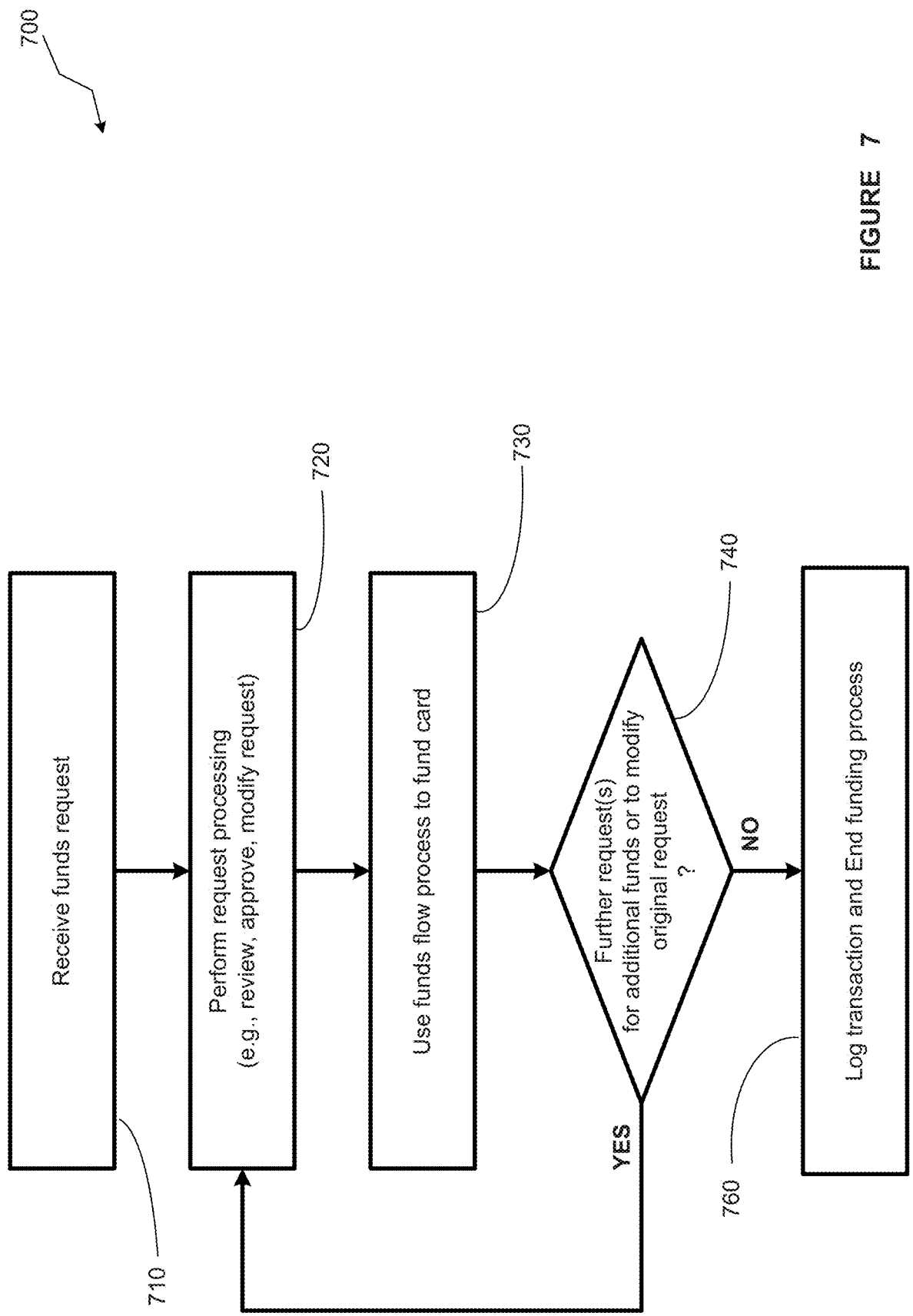
FIG. 7 illustrates a flowchart depiction of a request/approval process of funds, in accordance with some embodiments of the present disclosure.

Turning now to FIG. 7, a flowchart depiction of a method for performing an automated request approval process, in accordance with some embodiments herein, is illustrated. The user entity 150 may receive a request for funds from a user (block 710). The user may have prior instructions as to the appropriate procedures for requesting funds. For example, the user may be under a direction to request funds only when traveling on behalf of the user entity 150, or spending funds on behalf of the user entity 150. Other examples may include threshold requirements, such as a requirement for funds greater than a predetermined amount. Upon receiving a funds request, a request processing step may be performed (block 720). The request processing step in block 720 may comprise one or more actions. For example, a review process may be implemented upon receiving a funds request. The review process may include determining the sender's status prior to allowing such request, the appropriateness of the request, e.g., measured against thresholds, event requirements, etc., as well as available funds. The request processing step may also include a conditional approval based upon one or more contingencies that must be satisfied. A further review action may be performed in order to determine whether the contingency has been satisfied prior to providing a full approval.

The request processing step may also include a modification request that is sent back to the user initiating the funds request. For example, an administrator may require that the initial funds request is modified to reduce the requested amount, further explain the justification for the request, and/or provide further information regarding the request. Moreover, the request processing step may include providing an approval of the funding request. A graphical user interface example of approving funds based upon a request or a plurality of requests is provided in Appendix E. In some embodiments, the history of funds request approvals may be displayed and viewed by an administrator, as illustrated in Appendix E. Those skilled in the art would appreciate that other GUI may be provided to perform the approval of funds requests. A more detailed description of the request processing step is provided in FIG. 8 and accompanying description below.

Continuing referring to FIG. 7, upon performing the request processing step, a funds flow process may be implemented to fund an expense card (block 730). In one embodiment, the funds flow process illustrated in FIG. 6 may be implemented to satisfy the funds request. This step is performed in response to the result of the request processing step being an approval of the funds request. Alternatively, if the result of the funds request processing step is a request for modification or results that an approval, a determination is made whether additional funds is to be provided or whether the original request should be modified (block 740).

When a determination is made that additional funds have been requested or modifications to the original funds request have been requested and made, a further request processing step may be performed in order to determine whether to approve the request modification or deny the funds request (as indicated by the arrow from block 740 to block 720). If a determination is made that further requests for additional funds have not been made, or modifications to the original request have not been made and the funds have been approved and provided, the transaction may be logged and the funding process may end (block 760). If further funds are requested, then the process described in FIG. 7 is initiated and repeated similar to the description above.

Those skilled in the art would appreciate that additional steps to FIG. 7 may be added (e.g., intervening inquiries, intervening requests, additional checks with the card issuing entity 120 or the card processor 130, additional communications and interaction with the program manager 140, etc.) and remain within the spirit and scope of the present invention.

Figure 8:
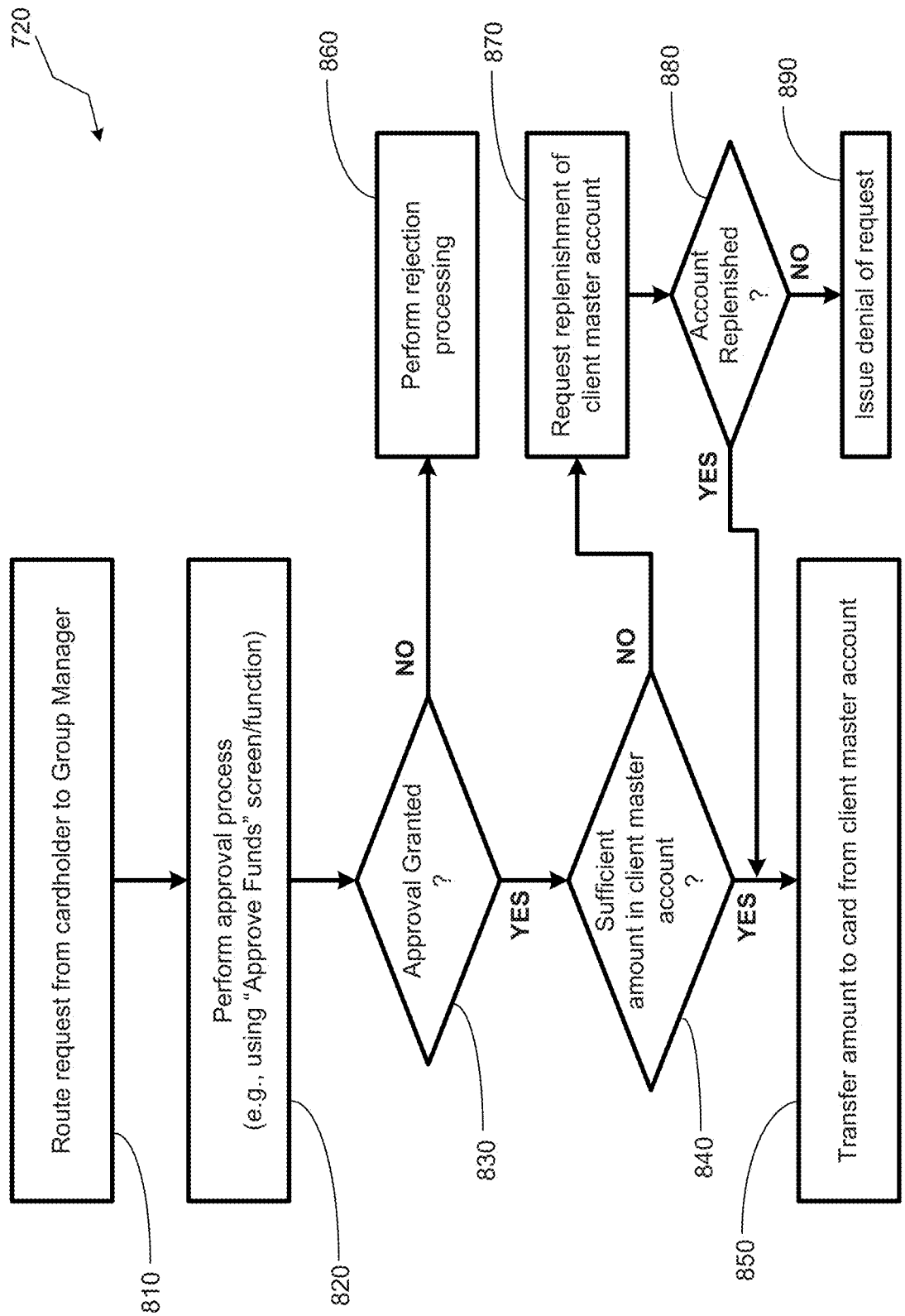
FIG. 8 illustrates a flowchart depiction of a request process of FIG. 7, in accordance with some embodiments of the present disclosure.

Turning now to FIG. 8, a flowchart depiction of a method of performing the request processing step of FIG. 7, in accordance with some embodiments, is illustrated. Upon receiving a request for funds from a user, the request may be routed from the card holder to an entity responsible for making one or more decisions with regard to the request (block 810). In some embodiments, a plurality of card holders may be grouped together. This group may be monitored by a group manager who may be in charge of approving, denying or modifying a request. In one embodiment, the group manager may be a person who manually makes a decision and provides a response via a computing system. In another embodiment, the group manager may be a hardware module, a software module, a firmware module, or a combination thereof, that may be programmed or configured to perform automated tasks of a group manager. The automated tasks of the group manager may include approving a request, denying a request, requesting a modification, and/or sending notifications of the approvals, denials, or request for modifications. In this manner, the entire process of evaluating, modifying and/or approving or denying a request may be performed automatically in real time or in near real time by a computing system.

Once a funds request is routed to an appropriate entity, such as a group manager, an approval process may be performed (block 820). The approval process may comprise checking one or more rules, thresholds or events to determine whether the requested funds should be approved. In some embodiments, the approval unit 520 in conjunction with the approval protocol module 530 (FIG. 5) may check various rules, thresholds or events to determine if appropriate to approve the requested funds. One example of a GUI for approving requested funds is provided in Appendix E, as described above.

Upon performing the approval process, a determination may be made as to whether approval of the funds requested has been granted (block 830). If the approval has not been granted, a rejection process step is performed (block 860). A rejection processing step may comprise providing a notification of a rejection and/or checking for various contingencies. A more detailed description of the rejection processing is provided in FIG. 9 and accompanying description below.

Continuing referring to FIG. 8, upon a determination that the approval has been granted in block 830, a determination is made whether sufficient funds in an account capable of funding the request, is available (block 840). For example, a determination may be made as to whether a client master account, which may hold an amount that is used to distribute funds in response to funds requests, has sufficient funds to fulfill the request. Upon a determination that sufficient funds in the client master account or equivalent account is found, the amount requested may be transferred to the requestor's expense card (block 850). As described above, the fund flow process described in FIG. 6 may be implemented to perform the transfer of the funds to the expense card.

Referring back to block 840, upon a determination that sufficient funds in the master account is not found, a request may be made for replenishing the master account (block 870). Various checks and balances may be implemented, which may manually or automatically determine whether to grant a replenishment of a master account. The checks and balances may include determining whether the entity making the request for replenishment is indeed authorized to make such a request. Further, the checks and balances may include sufficient funding has been authorized to provide the replenishment of the master account.

After a request for replenishment of the master account has been made (see block 870), a determination is may be made as to whether the master account has been sufficiently replenished (block 880). Upon a determination that sufficient amount has been replenished into the master account, the step of transferring the requested amount to the expense card may be performed, as indicated by the connection between block 880 and block 850. Upon a determination that the master account has not been sufficiently replenished, a denial of request may be issued (block 890). In alternative embodiments, a further message may be sent to the user indicating that current master account funds are insufficient and a later request may be made.

Figure 9:
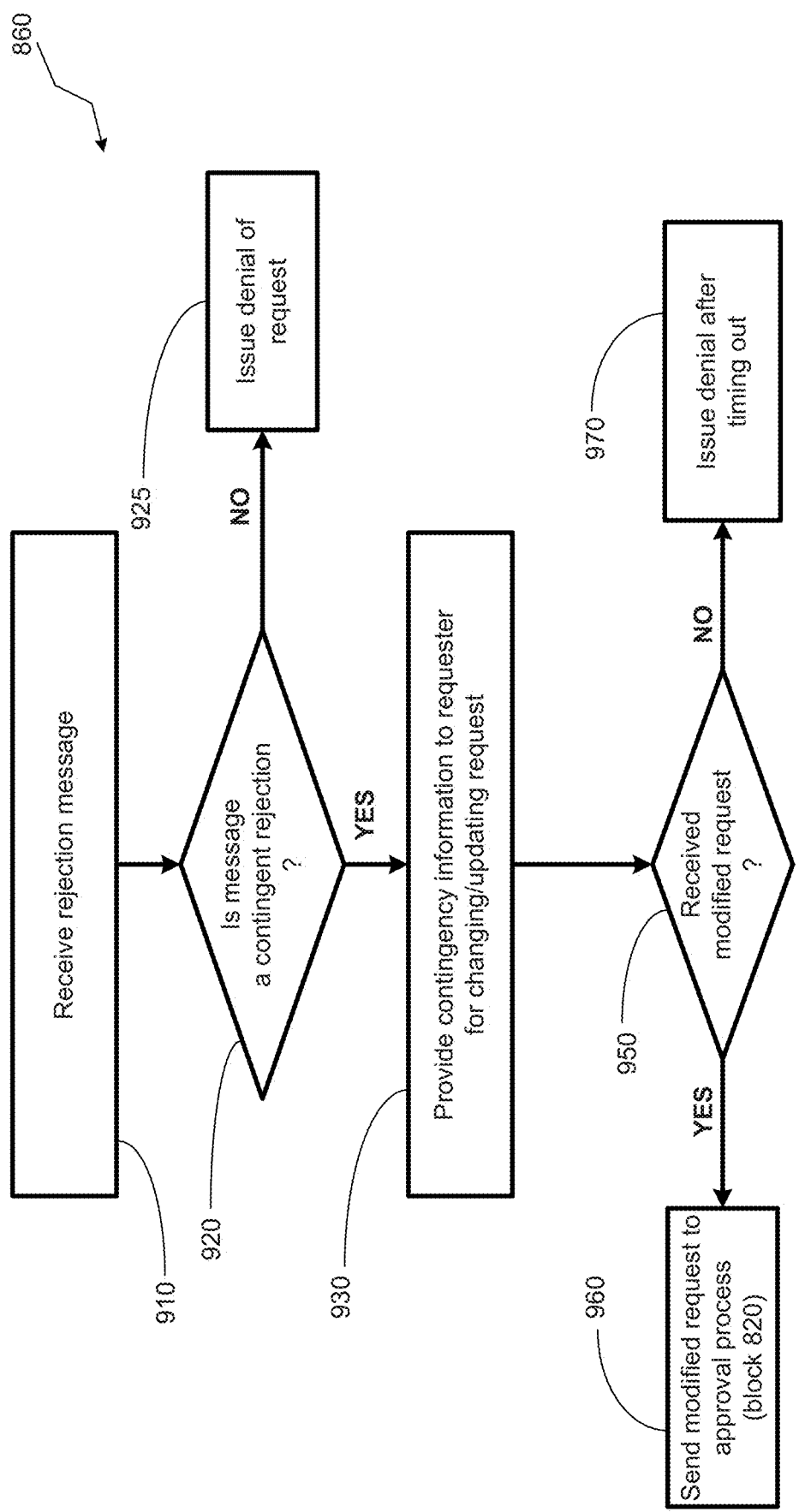
FIG. 9 illustrates a funds rejection process of FIG. 8, in accordance with some embodiments of the present disclosure.

Turning now to FIG. 9, a flowchart depiction of one embodiment of performing the rejection processing of block 860 of FIG. 8, in accordance with some embodiments, is illustrated. The rejection message may be received upon determining that the approval of the request was not granted (block 910). A determination is then made whether the rejection message is a contingent rejection (block 920). Upon a determination that the message is not a contingent rejection, a denial of the request may be issued (block 925).

Upon a determination that the rejection message is a contingent ejection (block 920), information associated with the contingency is provided to the requestor for changing and/or updating the request (block 930). This information may be used by the requestor to modify or updating the original request in order to satisfy the contingency and gain approval. For example, if a determination is made that the request exceeds a predetermined threshold, or did not meet a required threshold or event or rule, a contingent rejection may be made to allow the requestor to modify the original request to conform to the rules, thresholds, and/or required event test for further evaluation.

Upon providing the contingency information to the requestor, a determination is made whether a modified request is received (block 950). Upon a determination that the modified request has not been received within a predetermined period of time, a denial of the request may be issued (block 970). Upon a determination that the modified request is received, the modified request is sent for an approval process (as described in block 820 of FIG. 8) (block 960). In this manner, a request is either approved, rejected, or conditionally rejected, affording the requestor an opportunity to make modifications to conform to one or more contingencies in order to obtain approval of the request for funding.

Utilizing embodiments used herein, an automated process for a request for funding is provided. The embodiments herein provide for determining whether to approve or deny the funding, and providing approval of the funding, as well as the funds, in an automated fashion. In some embodiments, the funding request, the evaluation of the request, the approval of the request, and/or the automated funding based on the approval may be made in real time or in near real time for providing efficient access to funds.

The methods depicted in FIGS. 6-9 and described above may be governed by instructions that are stored in a non-transitory computer readable storage medium and that are executed by, e.g., a processor in a computing device. Each of the operations shown in FIGS. 6-9 may correspond to instructions stored in a non-transitory computer memory or computer readable storage medium. In various embodiments, the non-transitory computer readable storage medium includes a magnetic or optical disk storage device, solid state storage devices such as flash memory, or other non-volatile memory device or devices. The computer readable instructions stored on the non-transitory computer readable storage medium may be in source code, assembly language code, object code, or other instruction format that is interpreted and/or executable by one or more processors.

The particular embodiments disclosed above are illustrative only, as the disclosed subject matter may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the disclosed subject matter. Accordingly, the protection sought herein is as set forth in the claims below.

What is claimed:

1. A method for performing an automated transaction, comprising:
  receiving a request for funding from a remote device over a communications network;
  performing a request processing in response to said request, said request processing comprises:
    routing said request to an approval unit,
    determining by said approval unit that said funding is authorized, based on the request satisfying an event test or a rule, and
    determining that sufficient amount of funds are available for providing said funding, and
  performing at least one of providing said funding or denying said funding based upon said request processing;
    the request processing further comprising:
      performing a rejection processing in response to said denying said funding, wherein said rejection processing comprises:
        receiving a rejection message;
        determining whether said rejection message is a contingent rejection for failure of the request to satisfy a required event test or rule;
        issuing a denial of the request in response to a determination that said rejection message is not a contingent rejection;
        prompting a modification of said request to conform to the required event test or rule in response to a determination that said rejection message is a contingent rejection; and denying the request, in response to a predetermined amount of time passing after the prompting, in which amount of time no modified request was received.

2. The method of claim 1, wherein receiving the request for funding comprises receiving said request from the remote device over a communications network selected from the group consisting of the Internet, an Intranet, a cloud computing network; and a cellular communications network.

3. The method of claim 1, wherein said rejection processing comprises:
determining whether a modified request is received in response to said prompting;
approving said request in response to a determination that said modified request conforms to the required event test or rule; and
denying said request in response to a determination that said modified request does not conform to the required event test or rule.

4. The method of claim 1, further comprising:
determining whether a master account contains sufficient funding to fund said request;
requesting replenishment of said master account in response to determining that said master account does not contain sufficient funding to fund said request;
transferring a requested amount in response to at least one of determining that said master account contains sufficient funding to fund said request, or determining that said master account has been replenished; and
issuing a denial of said request in response to determining that said master account has not been replenished.

5. An apparatus for performing an automated transaction, said apparatus comprising:
a request unit for receiving a funding request;
an approval unit operatively coupled to said request unit, said funding approval unit configured to perform a request processing in response to said request, said request processing comprises routing said request, determining by said approval unit whether said funding is approved based on the request satisfying an event test or a rule, and determining whether sufficient amount of funds are available for providing said funding;
the request processing further comprising:
performing a rejection processing in response to said denying said funding, wherein said rejection processing comprises:
receiving a rejection message;
determining whether said rejection message is a contingent rejection for failure of the request to satisfy a required event test or rule;
issuing a denial of the request in response to a determination that said rejection message is not a contingent rejection;
prompting a modification of said request to conform to the required event test or rule in response to a determination that said rejection message is a contingent rejection;
denying the request, in response to a predetermined amount of time passing after the prompting, in which amount of time no modified request was received;
determining whether a modified request is received in response to said prompting;
approving said request in response to a determination that said modified request conforms to the required event test or rule; and
denying said request in response to a determination that said modified request does not conform to the required event test or rule; and
a funding unit operatively coupled to said funding approval unit, said funding unit configured for performing at least one of providing said funding or denying said funding based upon said request processing.

6. The apparatus of claim 5, further comprising an approval protocol module operatively coupled to said approval unit, wherein said approval protocol module comprises at least one of:
a rule for determining whether said funding is approved;
an event test for determining whether said funding is approved.

7. The apparatus of claim 5, further comprising an administrator unit operatively coupled to said approval unit and said funding unit, wherein said administrator unit is configured to set-up a transaction mechanism, and set up a master account for funding said transaction mechanism.

8. The apparatus of claim 7, wherein said transaction mechanism is an expense card, wherein said expense card is one of a debit card, a credit card, an electronic device capable of making a payment, an application operational on a mobile device, or an application running on a tablet device.

9. A non-transitory computer readable program storage unit encoded with instructions that, when executed by a computer, perform a method for performing an automated transaction, comprising:
receiving a request for funding;
performing a request processing in response to said request, said request processing comprises routing said request to an approval unit, determining by said approval unit that said funding is authorized based on the request satisfying an event test or a rule, and determining that sufficient amount of funds are available for providing said funding; and
performing at least one of providing said funding or denying said funding based upon said request processing;
the request processing further comprising:
performing a rejection processing in response to said denying said funding, wherein said rejection processing comprises:
receiving a rejection message;
determining whether said rejection message is a contingent rejection for failure of the request to satisfy a required event test or rule;
issuing a denial of the request in response to a determination that said rejection message is not a contingent rejection;
prompting a modification of said request to conform to the required event test or rule in response to a determination that said rejection message is a contingent rejection; and
denying the request, in response to a predetermined amount of time passing after the prompting, in which amount of time no modified request was received;
determining whether a modified request is received in response to said prompting;
approving said request in response to a determination that said modified request conforms to the required event test or rule; and
denying said request in response to a determination that said modified request does not conform to the required event test or rule.

10. The non-transitory computer readable program storage unit of claim 9, further comprising:
- determining whether a master account contains sufficient funding to fund said request;
- requesting replenishment of said master account in response to determining that said master account does not contain sufficient funding to fund said request;
- transferring a requested amount in response to at least one of determining that said master account contains sufficient funding to fund said request, or determining that said master account has been replenished; and
- issuing a denial of said request in response to determining that said master account has not been replenished.

11. The method of claim 1, wherein the request for funding consists of text.

12. The apparatus of claim 5, wherein the request unit is configured to only receive a funding request that consists of text.

13. The non-transitory computer readable program storage unit of claim 9, wherein the request for funding consists of text.

\* \* \* \* \*